United States Patent
Hutchison et al.

(10) Patent No.: US 7,329,833 B2
(45) Date of Patent: Feb. 12, 2008

(54) SYSTEM FOR IMPROVED HIGH-FREQUENCY ARC STARTING OF A WELDING PROCESS

(75) Inventors: Richard M. Hutchison, New London, WI (US); Jeffery J. Gadamus, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 342 days.

(21) Appl. No.: 10/906,179

(22) Filed: Feb. 7, 2005

(65) Prior Publication Data

US 2006/0175299 A1    Aug. 10, 2006

(51) Int. Cl.
*B23K 9/067* (2006.01)
(52) U.S. Cl. .................... 219/130.4; 219/75
(58) Field of Classification Search .......... 219/130.4, 219/75, 130.1, 136
See application file for complete search history.

(56) References Cited

U.S. PATENT DOCUMENTS

| | | | |
|---|---|---|---|
| 3,284,609 A * | 11/1966 | Allen et al. .......... | 219/130.4 |
| 3,431,390 A * | 3/1969 | Manz .................. | 219/75 |
| 4,855,566 A * | 8/1989 | Hays et al. .......... | 219/130.4 |
| 5,086,208 A * | 2/1992 | Habermann .......... | 219/130.1 |
| 6,137,079 A * | 10/2000 | Vincent et al. ...... | 219/130.4 |
| 2006/0054609 A1* | 3/2006 | Matthews et al. ..... | 219/130.4 |

FOREIGN PATENT DOCUMENTS

DE          3711989 A1 * 10/1988
JP     2001-138051 A  *  5/2001

OTHER PUBLICATIONS

English translation of German document No. DE3711989A1.*
Machine-generated English translation of Japanese document No. JP2001-138051A.*

* cited by examiner

*Primary Examiner*—Clifford C. Shaw
(74) *Attorney, Agent, or Firm*—Ziolkowski Patent Solutions Group, SC

(57) ABSTRACT

A welding gun is disclosed that includes an electrode configured to effectuate a welding-type process and a non-conductive nozzle configured to at least partially surround the electrode. The welding gun also includes a conductive casing at least partially surrounding the nozzle and electrically isolated from the electrode and a conductive path extending from the conductive casing through the welding gun.

19 Claims, 4 Drawing Sheets

SYSTEM FOR IMPROVED HIGH-FREQUENCY ARC STARTING OF A WELDING PROCESS

BACKGROUND OF THE INVENTION

The present invention relates generally to welding-type systems and, more particularly, to an apparatus for improved high-frequency arc starting of a welding process.

There are a large number of welding processes available for use in industry. For example, some welding processes include gas tungsten arc, oxygen gas welding, and shielded metal arc welding. The gas tungsten arc welding process is generally referred to as tungsten inert gas (TIG) welding. A typical TIG welding apparatus includes a welding component which is commonly referred to as welding torch or gun and is designed to control a tungsten electrode during a welding process. That is, the welding gun holds the electrode which is heated to extremely high temperatures by electrical power received from the power source. At appropriate voltage and current, a welding arc is created between the electrode and the workpiece.

It is well known that TIG welding is often preferably started using a high-frequency (HF) starting system. High-frequency starting is a method of generating an arc without moving parts or the wear associated with shorting and breaking. To perform HF starting, a welding gun is connected to a power source having an HF starting circuit. The circuit typically includes a high-voltage transformer, capacitors for power conditioning, and a nozzle assembly configured to generate a high-voltage spark at the torch electrode. When sufficient voltage is impressed from the power source to the gun, a spark fires from the electrode and traverses a gap between the electrode and the workpiece.

However, while HF starting systems serve to protect the electrode from the wear associated with shorting and breaking of a contact starting system, it is often less reliable than contact starting systems. For example, it is not uncommon that HF starting a TIG welding process may fail on more than 25% of starts.

As such, some operators have attempted to improve the reliability of HF starting by decreasing the distance between the electrode and workpiece during the HF start. However, as the gap between the electrode and workpiece is decreased, the probability of the electrode contacting the workpiece increases. Should the electrode strike the workpiece, the advantage of decreased wear afforded by HF starting is removed. Furthermore, in TIG welding processes, should the tungsten electrode strike the workpiece, some of the tungsten may be transferred to the workpiece and reduce the integrity of the weld.

Accordingly, some operators have designed a way to "move" the workpiece electrically closer to the electrode without reducing the gap between the electrode and the workpiece. That is, some operators have connected a wire from the workpiece to the nozzle where it is clamped thereto. While this piecemeal system increases HF starting performance it has many drawbacks.

Specifically, the system is insecure, unstable, and may be unintentionally separated or dismantled during normal welding operations. That is, these systems are prone to inadvertently disassembly because the wire connecting the workpiece to the nozzle is merely clamped in place and dangling from the welding gun. As such, the wire may be inadvertently removed from the clamp or may interfere with the welding process. Furthermore, the clamp may obscure the operator's view of the workpiece or interfere with the welding process. Additionally, the clamp may be easily moved or dislodged from the nozzle during normal welding operations.

Also, the clamp securing the wire to the nozzle, while integral in creating the advantages of these piecemeal systems, is undesirable. That is, the clamp is electrically charged and, therefore, creates a system that may not comply with applicable workplace standards and regulations.

Therefore, it would be desirable to design a system to improve the consistency of HF starting that does not interfere with the welding process, is not susceptible to inadvertent movement or disassembly, and is compliant with acceptable workplace standards and regulations.

BRIEF DESCRIPTION OF THE INVENTION

The present invention solves the aforementioned drawbacks by providing a high-frequency arc starting system that includes a nozzle assembly that is configured to be integrated within a welding gun to improve HF starting reliability and consistency.

Therefore, in accordance with one aspect of the invention, a welding gun is disclosed that includes an electrode configured to effectuate a welding-type process and a non-conductive nozzle configured to at least partially surround the electrode. The welding gun also includes a conductive casing at least partially surrounding the nozzle and electrically isolated from the electrode and a conductive path extending from the conductive casing through the welding gun.

In accordance with another aspect of the invention, a welding-type system is disclosed that includes a welding-type power source and a welding-type gun connected to the welding-type power source through a cable. The welding-type gun includes an electrode configured to receive an electrical charge from the welding-type power source having a first polarity to effectuate a welding-type process. The welding-type gun also includes a conductive jacket disposed about at least a portion of the electrode and configured to receive an electrical charge from the welding-type power source having a second polarity to aid in starting the welding-type process.

In accordance with yet another aspect of the invention, a welding gun nozzle is disclosed that includes a non-conductive body configured to receive an electrode therein and a conductive layer surrounding at least a portion of the non-conductive body. The welding gun nozzle also includes a conductive path integrally formed with and extending from the conductive layer.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
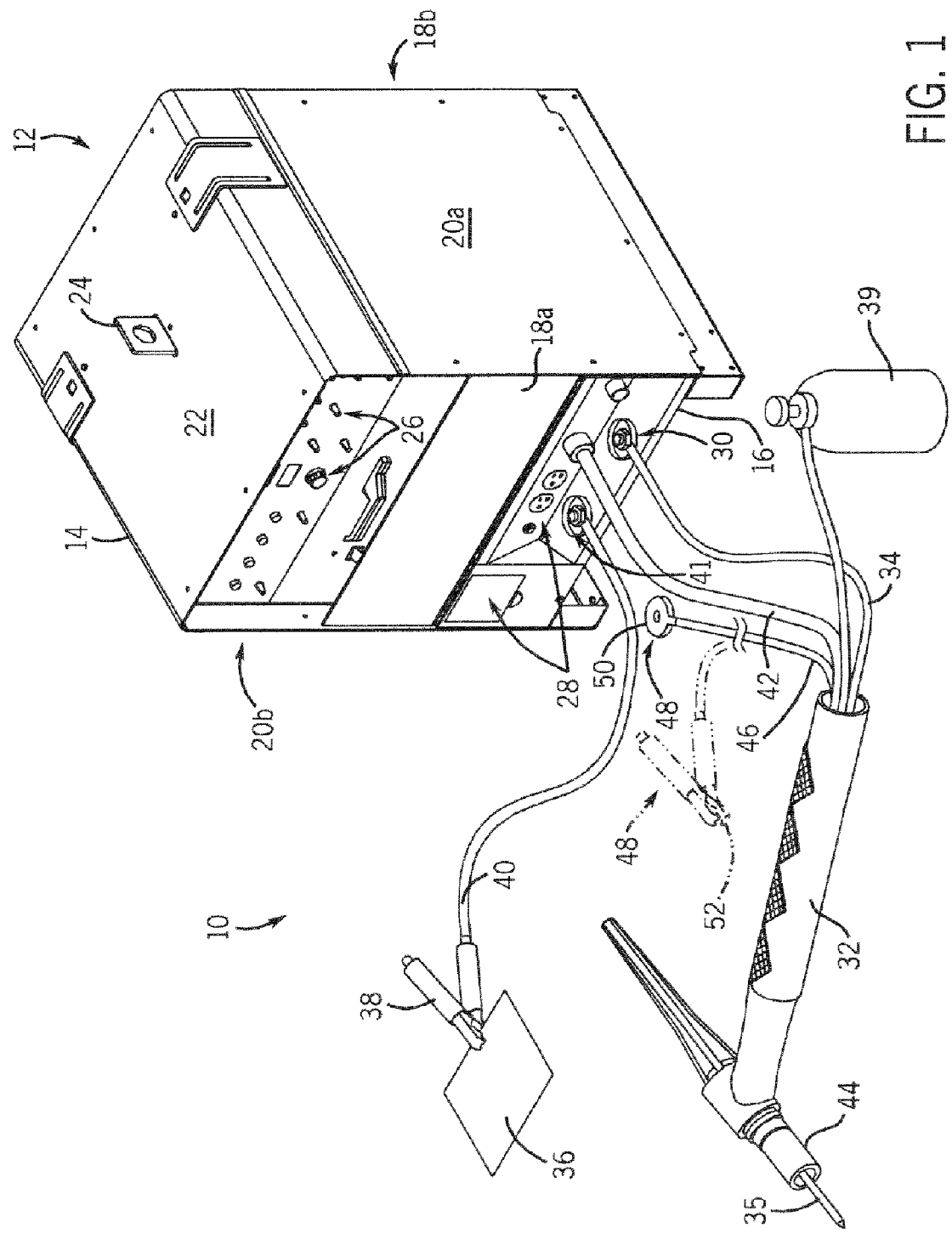
FIG. 1 is a perspective view of a welding-type system incorporating one embodiment of the present invention.

FIG. 1 is a perspective view of a welding-type system 10 suitable for a number of welding processes including tungsten inert gas (TIG) welding. The welding-type system 10 includes a power source 12 disposed within an enclosure 14. The power source 12 is constructed to condition raw power from a power supply into a power suitable for welding. Enclosure 14 is defined by a base 16, front and back panels 18a, 18b, and a pair of side panels 20a, 20b attached to the base 16. A top cover 22 having a handle 24 is secured to the pair of side panels 20a, 20b to form enclosure 14. The front panel includes control knobs 26 and outlets and receptacles 28 to facilitate connection of welding accessories to the power source 12. A welding gun output terminal 30 is used to connect a torch or gun 32 to the power source via cable 34. The gun 32 is designed to hold a tungsten electrode 35. To complete a welding circuit, a clamp 38 connects a workpiece 36 to the power source 12 via a cable 40 and workpiece output terminal 41. A gas cylinder 39 is used to store gas which is delivered to the torch during the welding process.

In addition to the power source 12, the enclosure 14 may also house an optional cooling system (not shown) designed to regulate the temperature of the gun 32 and the component internal to the enclosure 14. In this regard, the optional cooling system is designed to circulate coolant to and from the gun 32 via a coolant conduit or path 42.

As will be described, the welding gun 32 includes an integrated HF starting system configured to improve HF starting performance and consistency. Specifically, as will be described, the nozzle assembly 44 includes a conductive casing configured to be connected via an integrated conductive path 46 to the workpiece output terminal 41, workpiece 38, or enclosure 14 via a fastener 48. It is contemplated that the fastener 48 may include at least one of a ring 50 configured to engage the workpiece output terminal 41 or enclosure 14 or a clamp 52 (shown in phantom) configured to engage the workpiece 36 or enclosure 14. As will be described, when the fastener 48 is engaged with the workpiece 36, workpiece output terminal 41, or enclosure 14, the nozzle assembly 44 and electrode 35 form a capacitive component configured to improve HF starting performance and consistency.

Figure 2:
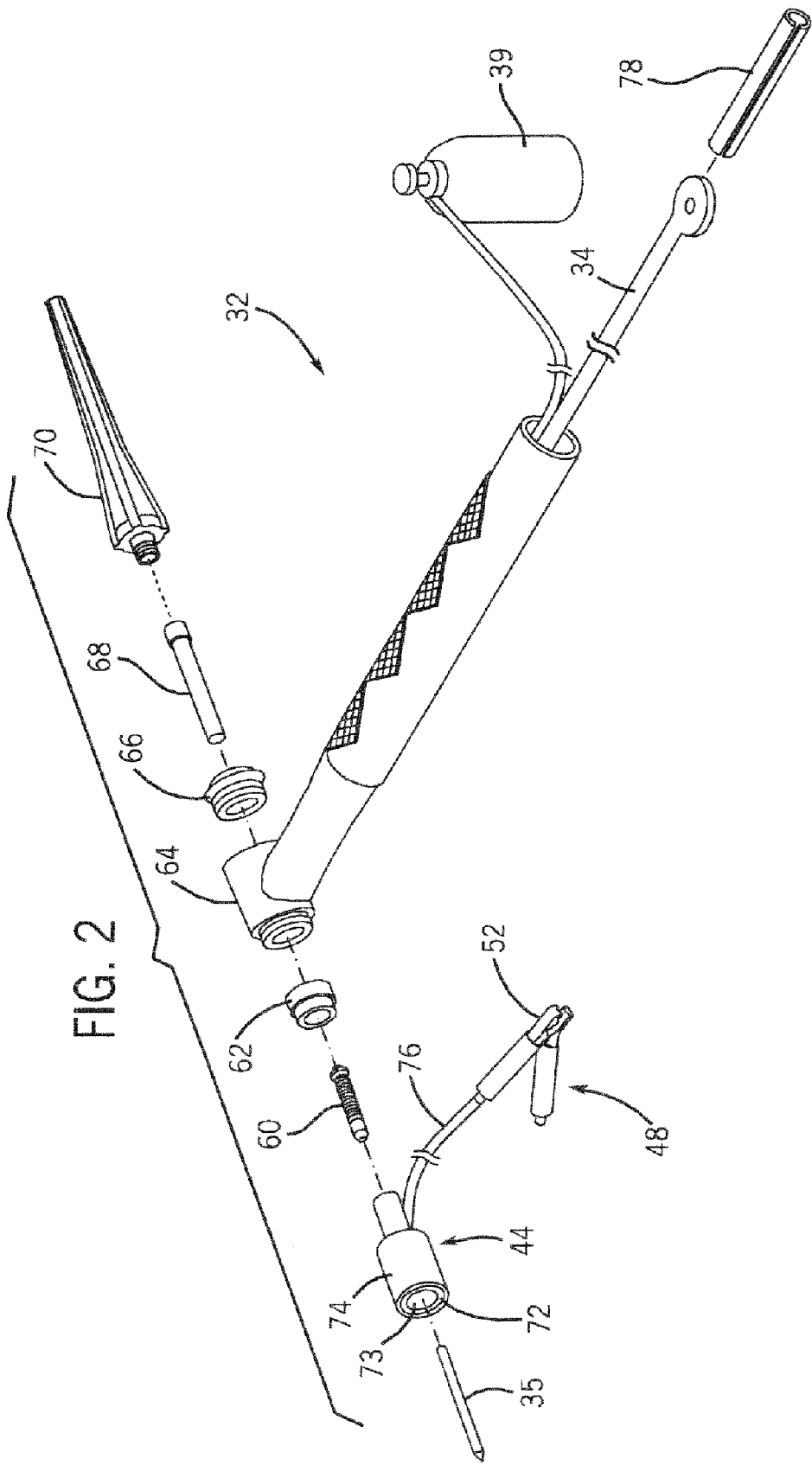
FIG. 2 is an exploded view of the welding gun of FIG. 1 incorporating another embodiment of the present invention.

Referring now to FIG. 2, an exploded view of the welding gun 32 of FIG. 1 is shown. The welding gun 32 includes the electrode 35 that is configured to be partially surrounded by a nozzle assembly 44. As will be described, the nozzle assembly may include multiple configurations. A collet body 60 is configured to engage the electrode 35 and pass through a heat shield 62, a torch body 64, and backcap insulator 66 to engage a collet 68. The collet 68, in turn, engages a backcap 70.

The nozzle assembly 44 is formed of multiple components. The nozzle assembly 44 includes a non-conductive layer 72 that, for example, may be formed of porcelain or ceramics. The non-conductive layer 72 defines a hollow inner portion or chamber 73. In this regard, the non-conductive layer 72 may be formed as a cylinder to allow the electrode 35 to pass therethrough. It is contemplated, however, that the non-conductive layer 72 may be formed in other geometrical shapes, such as frusto-conical. A conductive layer or casing 74 is formed to surround at least a portion of the non-conductive layer 72. According to one embodiment, the conductive layer 74 is formed of a thin metallic conductor that may be secured to the non-conductive layer 72 as a foil. In other contemplated embodiments, the conductive layer 74 may be sprayed or painted onto the non-conductive layer 72.

Extending from the nozzle assembly 44 and electrically connected to the conductive layer 74 is a conductive path 76. The conductive path 76 is preferably an insulated wire that extends from the conductive layer 74 to a fastener 48. As previously described, the fastener 48 may be a clamp 52 configured to engage the workpiece 36 or enclosure 14 of FIG. 1 or a ring 50 of FIG. 1 that is connectable to the workpiece output terminal 41 or enclosure 14 of FIG. 1. Referring again to FIG. 2, the conductive path 76 is configured to extend directly from the nozzle assembly 44 to facilitate retrofitting into a variety of welding guns. Further, a sleeve 78 may be included to aid in positioning the conductive path 76 near the torch body 64 or power cable 34 so as to not interfere with operation of the gun 32 during a welding process.

When the welding gun 32 is assembled and the fastener 48 is engaged with the workpiece, workpiece output terminal, or enclosure of the power source, the nozzle assembly 44 and electrode 35 form a capacitive component configured to improve HF starting performance and consistency. Specifically, when the fastener 48 is engaged with the workpiece, workpiece output terminal, or enclosure of the power source, an electrical charge having a first polarity is supplied from the power source via the conductive path 76 to the conductive layer 74. Similarly, a charge having a second polarity is supplied from the power source via the power cable 34 to the electrode 35. The oppositely charged electrode 35 and conductive layer 74 are separated by the air gap 73 and the non-conductive layer 72. The potential difference between the electrode 35 and conductive layer 74 along with the insulating air gap and non-conductive layer 72 form a capacitive component that is used to improve HF starting.

Specifically, as gas is supplied from the gas bottle 39 or other gas supply, the potential difference between the electrode 35 and conductive layer 74 aids in the creation of a plasma discharge of the gas supplied to the nozzle assembly 44. The plasma discharge creates ultraviolet (UV) light having sufficient energy to overcome the work function of the tungsten electrode 35. Accordingly, by way of the photoelectric effect, an electron is dislodged from the electrode 35 and directed toward the workpiece. This dislodged electron initiates an avalanche of electrons to form a spark between the electrode and the workpiece.

This system advantageously induces these events within the nozzle assembly 44. That is, by inducing an electron avalanche within the nozzle assembly 44 as opposed to the events occurring outside the nozzle between the electrode and the workpiece, a higher volume of gas is within closer proximity to a larger portion of the electrode 35 when the events occur. Accordingly, the probability that the UV light will sufficiently impinge the electrode 35 to dislodge an electron is increased. As such, HF starting reliability and consistency is improved.

It is desirable that the area of the conductive layer 74 be maximized along the surface of the non-conductive layer 72 to maximize the capacitance created between the conductive layer 74 and the electrode 35. However, it is also desirable that the conductive layer 72 not extend beyond the outside of the non-conductive layer 72. That is, should the conductive layer 74 extend so far as to not be insulated by the non-conductive layer 72, a discharge of the stored potential could undesirably occur between the electrode 35 and the conductive layer 74 and, thus, form an arc therebetween.

Figure 3:
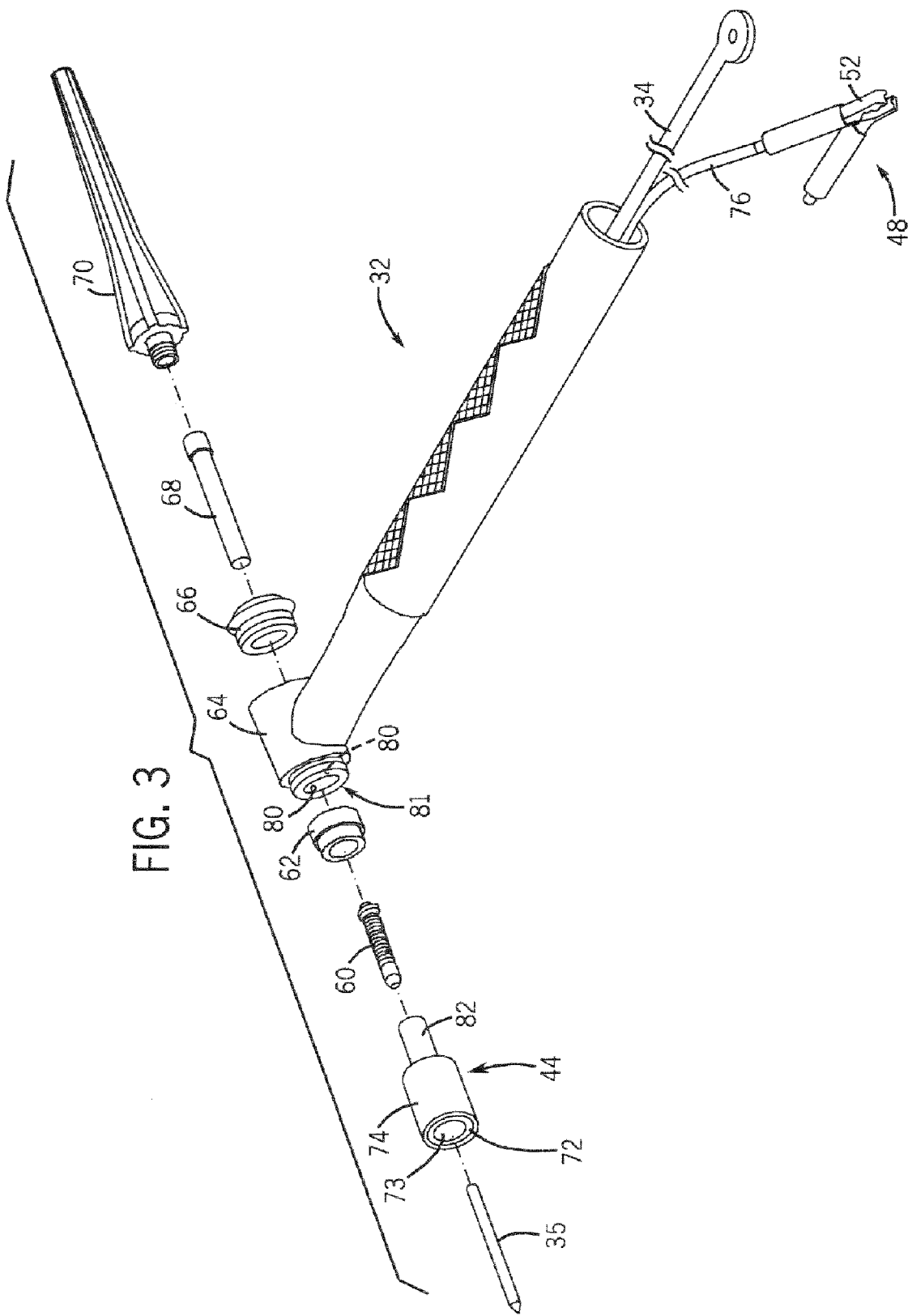
FIG. 3 is an exploded view of the welding gun of FIG. 1 incorporating yet another embodiment of the present invention.

Referring now to FIG. 3, an exploded view of the welding gun 32 of FIG. 1 illustrates another embodiment of the present invention. In this embodiment, the conductive path 76 is integrated within the welding gun 32. By integrating the conductive path 76 within the torch body 64, the conductive path 76 is enclosed within the torch body 64 and shielded from possible interference with the welding process.

In this embodiment, electrodes or contacts 80 are included within a portion of the torch body 64 that forms a socket 81. The contacts 80 are configured to engage the conductive layer 74 of the nozzle assembly 44 when the nozzle assembly 44 is secured to or within the torch body 64. That is, the conductive layer 74 of the nozzle assembly 44 is configured to at least partially extend along a lip 82 of the nozzle assembly 44. When the nozzle assembly 44 is secured to the torch body 64, for example by way of snap-fitting or threading, the contacts 80 are configured to complete an electrical connection from the conductive path 76 to the conductive layer 74. Therefore, when the fastener 48 is engaged with the workpiece, workpiece output terminal, or enclosure of the power source, the conductive layer 74 is energized. Accordingly, as previously described a capacitive component is created that can be exploited to improve HF starting of a welding process.

Figure 4:
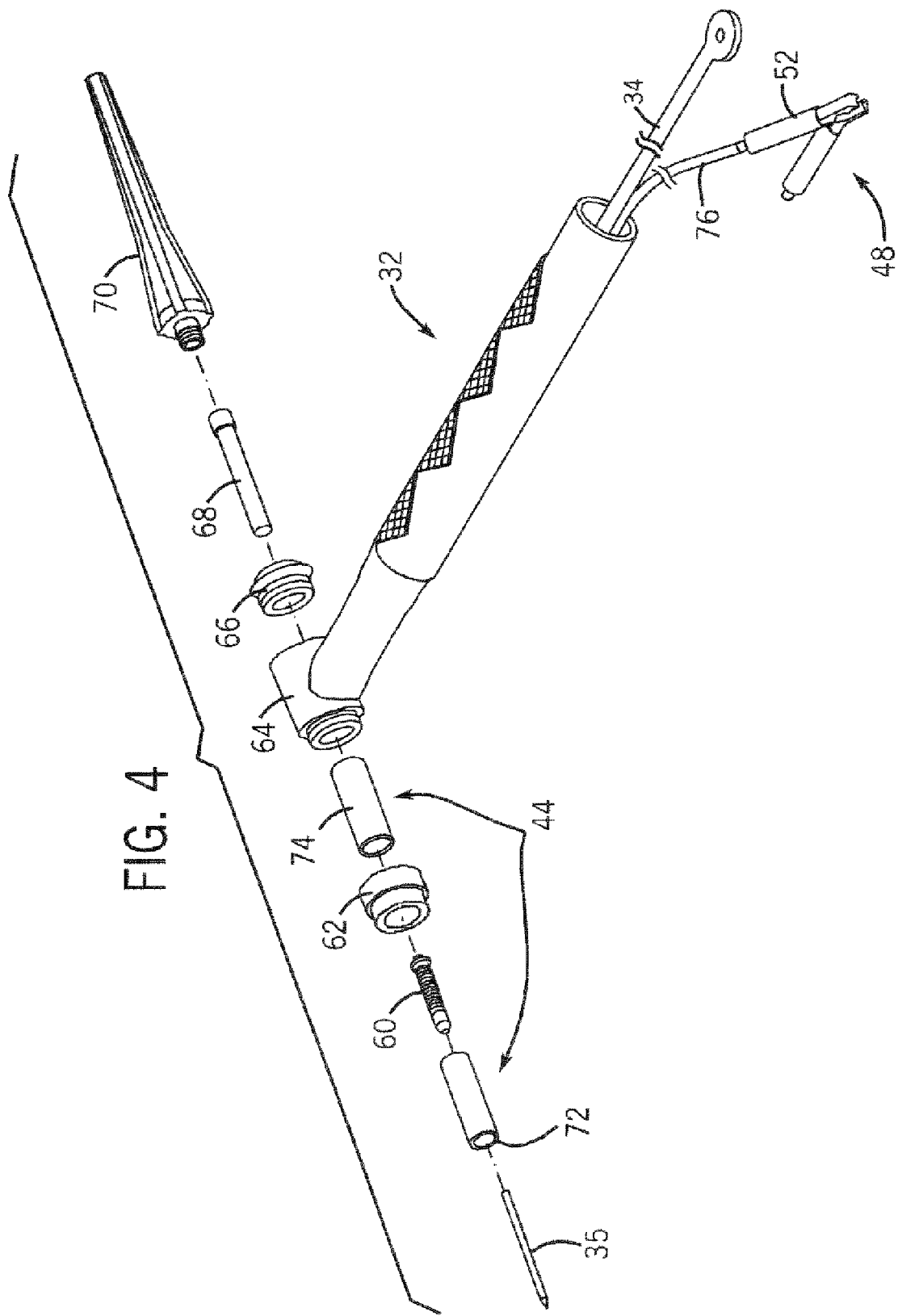
FIG. 4 is an exploded view of the welding gun of FIG. 1 incorporating still another embodiment of the present invention.

Referring now to FIG. 4, another embodiment of the present invention is shown. According to this embodiment, the conductive layer 74 is formed as a sheath. That is, the conductive layer 74 is formed as a sheath that is configured to removeably engage the non-conductive layer 72 to form the nozzle assembly 44. Accordingly, the conductive layer 74 forms a conductive jacket around the non-conductive layer 72 when both directly engage the torch body 64. Furthermore, it is contemplated that the conductive layer 72 may be permanently affixed to the torch body 64 or may be snap-fit or threadedly secured to the torch body 64.

By configuring the conductive layer 74 to be integrated with the torch body 64, the conductive path 76 may be integrated with the torch body 64 as well. That is, the welding torch 32 has the conductive path 76 integrated within the torch body 64. Therefore, the conductive path 76 may be permanently affixed to the torch body and the conductive path 76 may be similarly permanently engaged with the conductive layer 74. On the other hand, the conductive layer 74 may be configured to be snap-fittedly or threadedly engaged with the torch body 64 and the conductive path 76 may be permanently affixed to the snap-fitted connection or the threaded engagement to which the conductive layer 74 is connected. Accordingly, when the fastener 48 is engaged with the workpiece or connected to the workpiece output terminal or the enclosure of the power source, the conductive layer 74 is energized. That is, as previously described, a capacitive component is created that improves HF starting and consistency.

Therefore, one embodiment of the present invention includes a welding gun. The welding gun includes an electrode configured to effectuate a welding-type process and a non-conductive nozzle configured to at least partially surround the electrode. The welding gun also includes a conductive casing at least partially surrounding the nozzle and electrically isolated from the electrode and a conductive path extending from the conductive casing through the welding gun.

In accordance with another embodiment of the invention, a welding-type system includes a welding-type power source and a welding-type gun connected to the welding-type power source through a cable. The welding-type gun includes an electrode configured to receive an electrical charge from the welding-type power source having a first polarity to effectuate a welding-type process. The welding-type gun also includes a conductive jacket disposed about at least a portion of the electrode and configured to receive an electrical charge from the welding-type power source having a second polarity to aid in starting the welding-type process.

Another embodiment of the invention includes a welding gun nozzle. The welding gun nozzle includes a non-conductive body configured to receive an electrode therein and a conductive layer surrounding at least a portion of the non-conductive body. The welding gun nozzle also includes a conductive path integrally formed with and extending from the conductive layer.

The above-described apparatus illustrates just one embodiment in which the present invention may be implemented. The present invention is equivalently applicable with many welding-type systems.

The present invention has been described in terms of the preferred embodiment, and it is recognized that equivalents, alternatives, and modifications, aside from those expressly stated, are possible and within the scope of the appending claims.

What is claimed is:

1. A welding gun comprising:
  an electrode configured to effectuate a welding-type process;
  a non-conductive nozzle configured to at least partially surround the electrode;
  a conductive casing at least partially and removably surrounding the nozzle and electrically isolated from the electrode; and
  a conductive path extending from the conductive casing through the welding gun.

2. The welding gun of claim 1 further comprising a fastener connected to an end of the conductive path opposite the nozzle.

3. The welding gun of claim 2 wherein the fastener is configured to be removeably affixed to at least one of a welding workpiece, an output power terminal, and an enclosure of a welding-type power source to create a potential difference between the conductive casing and the electrode.

4. The welding gun of claim 1 wherein the conductive casing includes at a conductive sheath.

5. The welding gun of claim 1 further comprising a heat shield at least partially surrounding the conductive casing and a collet extending through the non-conductive nozzle.

6. The welding gun of claim 1 wherein the welding gun is a tungsten inert gas (TIG) type welding gun.

7. The welding gun of claim 1 further comprising:
  a socket configured to receive the nozzle;
  at least one electrical contact electrically connected to the conductive path and disposed within the socket; and
  wherein the electrical contact is configured to engage the conductive casing when the nozzle is affixed within the socket.

8. The welding gun of claim 1 wherein the conductive casing is fixedly secured to the welding gun.

9. A welding-type system comprising:
  a welding-type power source;
  a welding-type gun connected to the welding-type power source through a cable and comprising:

an electrode configured to receive an electrical charge from the welding-type power source having a first polarity to effectuate a welding-type process;

a conductive jacket disposed about at least a portion of the electrode and configured to receive an electrical charge from the welding-type power source having a second polarity to aid in starting the welding-type process;

a first heat shield surrounding at least a portion of the conductive jacket and a second heat shield disposed at an end of the welding-type gun opposite the electrode; and wherein the conductive jacket is permanently affixed to the welding-type gun.

10. The welding-type system of claim 9 further comprising a conductive path configured to engage the conductive jacket and extend to a fastener configured to engage at least one of the welding-type power source and a workpiece to provide the electrical charge to the conductive jacket.

11. The welding-type system of claim 9 further comprising a nozzle configured to at least partially surround the electrode and forming a resistive baffler between the electrode and the conductive jacket.

12. The welding-type system of claim 11 wherein the conductive jacket is configured to be fixed within the welding-type gun to formn a separable conductive sheath surrounding at least part of the nozzle.

13. The welding-type system of claim 11 wherein the cable and a conductive path electrically connected to the conductive jacket extend through a handle of the welding-type gun.

14. The welding-type system of claim 9 wherein the welding-type process includes a TIG welding process.

15. The welding-type system of claim 9 further comprising a sleeve configured to surround at least a portion of the conductive path to secure the conductive path to the cable.

16. A welding gun nozzle comprising:
a non-conductive body configured to receive an electrode therein;

a conductive layer removably surrounding at least a portion of the non-conductive body;

a conductive path integrally formed with and extending from the conductive layer to a fastener;

a sleeve configured to secure the conductive path to at least one of a welding gun and a power cable; and wherein the conductive layer is a sheath fixedly attached to a welding gun and configured to removably engage about a circumference of the non-conductive body.

17. The welding gun nozzle of claim 16 wherein the conductive layer is configured to be energized with a charge having a polarity opposite that of the electrode when the electrode is energized and wherein the fastener is configured to engage a terminal of a welding-type power source.

18. The welding gun nozzle of claim 16 wherein the fastener is configured to engage a workpiece independently of a fastener from a welding-type power source providing power to the electrode.

19. A welding-type system comprising:
a welding-type power source;

a welding-type gun connected to the welding-type power source through a cable and comprising:

an electrode configured to receive an electrical charge from the welding-type power source having a first polarity to effectuate a welding-type process;

a conductive jacket disposed about at least a portion of the electrode and configured to receive an electrical charge from the welding-type power source having a second polarity to aid in starting the welding-type process; and wherein the conductive jacket is configured to be fixed within the welding-type gun to form a separable conductive sheath surrounding at least part of the nozzle.

* * * * *